United States Patent
Odendall

(10) Patent No.: US 8,011,173 B2
(45) Date of Patent: Sep. 6, 2011

(54) METHOD FOR THE DIAGNOSIS OF A THREE-WAY-CATALYTIC CONVERTER FOR AN INTERNAL COMBUSTION ENGINE

(75) Inventor: Bodo Odendall, Lenting (DE)

(73) Assignee: Audi, AG, Ingolstadt (DE)

( * ) Notice: Subject to any disclaimer, the term of this patent is extended or adjusted under 35 U.S.C. 154(b) by 727 days.

(21) Appl. No.: 12/060,343

(22) Filed: Apr. 1, 2008

(65) Prior Publication Data

US 2008/0245057 A1    Oct. 9, 2008

(30) Foreign Application Priority Data

Apr. 7, 2007 (DE) .......................... 10 2007 016 763

(51) Int. Cl.
*F01N 3/00* (2006.01)
(52) U.S. Cl. .............. 60/276; 60/274; 60/285; 123/103; 123/109
(58) Field of Classification Search .................... 60/274, 60/276, 277, 285; 123/103, 109
See application file for complete search history.

(56) References Cited

U.S. PATENT DOCUMENTS

| | | | |
|---|---|---|---|
| 5,528,899 A * | 6/1996 | Ono | 60/276 |
| 5,983,629 A * | 11/1999 | Sawada | 60/276 |
| 6,637,194 B2 | 10/2003 | Kakuyama et al. | |
| 6,988,359 B2 * | 1/2006 | Ide et al. | 60/285 |
| 7,000,385 B2 * | 2/2006 | Miyashita | 60/295 |
| 7,104,047 B2 * | 9/2006 | Takubo | 60/285 |
| 7,559,193 B2 * | 7/2009 | Iihoshi et al. | 60/285 |

* cited by examiner

*Primary Examiner* — Binh Q Tran
(74) *Attorney, Agent, or Firm* — Novak Druce + Quigg LLP

(57) ABSTRACT

A method for the diagnosis of a three-way catalytic converter for an internal combustion engine using the voltage signal of a downstream binary lambda sensor proposes that with a changeover of the air/fuel ratio λ that is fed to the internal combustion engine from high to low, the voltage signal $U_\lambda$ of the lambda sensor is monitored for its jump in order to establish a first oxygen storage capacity OSC1 of the catalytic converter, with a changeover of the air/fuel ratio that is fed to the internal combustion engine from low to high, the voltage signal $U_\lambda$ of the lambda sensor is monitored for its jump in order to establish a second oxygen storage capacity OSC2 of the catalytic converter, and/or with a modulation of the air/fuel ratio that is fed to the internal combustion engine between high and low, the voltage signal $U_\lambda$ of the lambda sensor is monitored for its jumps in order to establish a third oxygen storage capacity OSC3 of the catalytic converter, wherein the diagnosis of the catalytic converter is performed based on the ratio between two of the three oxygen storage capacities. According to the proposal, a diagnostic method differentiated with regard to reversible and irreversible damage, as well as with regard to oxidizing and reducing capabilities is provided.

7 Claims, 3 Drawing Sheets

METHOD FOR THE DIAGNOSIS OF A THREE-WAY-CATALYTIC CONVERTER FOR AN INTERNAL COMBUSTION ENGINE

CROSS-REFERENCE

This application claims priority from German Patent Application No. 10 2007 016 763.8 filed Apr. 7, 2007.

BACKGROUND OF THE INVENTION

The present invention relates to a method for the diagnosis of a three-way catalytic converter for an internal combustion engine using the voltage signal of a downstream binary lambda sensor.

With the diagnosis of catalytic converters the problem exists that reversible damage occurs due to sulfur poisoning, and irreversible damage of the function of the catalytic converter occurs due to deterioration. Both lead to the reduction of the pollutant conversion such that a conversion that may no longer be sufficient is indicated. However, in the case of reversible damage, the reduction of the pollutant conversion can be reversed.

A method for the determination of the deterioration condition of a storage catalytic converter is described in patent specification DE 103 18 214 B4. The entire reduction of the storage capacity of the catalytic converter is initially established, then the reduction of the storage capacity due to sulfur is calculated by means of a thionation model in consideration of a predetermined sulfur content of the fuel, and in a final step the difference of the entire reduction and of the reversible reduction due to sulfur is formed. This difference corresponds to the irreversible reduction of the storage capacity of the catalytic converter, and is finally compared to a predetermined maximum value.

A catalytic converter diagnostic method is known from patent specification DE 198 44 178 A1, which, in a first method step, performs a regeneration attempt for removing any reversible damage of the functionality, checks the functionality after a completed regeneration attempt, and finally assesses the functionality of the catalytic converted on the basis of this test. Thus, the reversible damage is eliminated in this method such that ultimately only the irreversible damage is considered in the assessment of the catalytic converter.

Furthermore, a method for the diagnosis of a storage catalytic converter is described in the patent specification DE 103 02 700 A1. According to this method the storage catalytic converter is operated in a storage and regeneration mode, and differentiations are made between a reversible and an irreversible damage of the storage catalytic converter in dependency of the storage characteristics and the regeneration time. Accordingly, with low storage characteristics and a long regeneration time, thionation is assumed, while with low storage characteristics and a short regeneration time, a thermal deterioration is diagnosed.

In this regard the task of the invention is to provide a further improved method for the diagnosis of a three-way catalytic converter, which allows an accurate differentiation of damage possibly occurring. Further, the performance of the diagnosis method should not cause any additional emissions.

SUMMARY OF THE INVENTION

The task is solved in that with a changeover of the air/fuel ratio that is fed to the internal combustion engine from high to low, the voltage signal of the lambda sensor is monitored for its jump in order to establish a first oxygen storage capacity OSC1 of the catalytic converter, with a changeover of the air/fuel ratio that is fed to the internal combustion engine from low to high, the voltage signal of the lambda sensor is monitored for its jump in order to establish a second oxygen storage capacity OSC2, and/or with a modulation of the air/fuel ratio that is fed to the internal combustion engine between high and low, the voltage signal of the lambda sensor is monitored for its jumps in order to establish a third oxygen storage capacity OSC3 of the catalytic converter, wherein the diagnosis of the catalytic converted is performed based on the ratio between two of the three oxygen storage capacities OSC1, OSC2, or OSC3. By means of this approach it becomes clear in which way the converting capability of the catalytic converter has changed over. Differentiation can be principally made between reversible or irreversible damage and the oxidizing, or reducing capabilities of the catalytic converter.

If the ratio between the first oxygen storage capacity OSC1 or the second oxygen storage capacity OSC2 and the third oxygen storage capacity OSC3 has increased as opposed to the reference value RW13 or RW23 that is stored for a new catalytic converter, a reduction of thermal conversion can be assumed, and a reversible damage of the catalytic converter is assumed during the diagnosis. This damage caused by contamination brings about a "clogging" of the storage spaces for oxygen such that the lambda sensor downstream of the catalytic converted accordingly detects a premature lack or excess of oxygen in the exhaust emission. With the reduction of a reversible damage a regeneration of the oxygen storage may be induced.

If the ratio between the first oxygen storage capacity OSC1, or the second oxygen storage capacity OSC2 and the third oxygen storage capacity OSC3 drops as opposed to the reference value RW13 or RW23 that is stored for a new catalytic converter, a reduction of the oxygen storage is assumed in the diagnosis, which represents irreversible damage of the catalytic converter.

If the ratio between the first oxygen storage capacity OSC1, or the second oxygen storage capacity OSC2 and the third oxygen storage capacity OSC3 is increased as opposed to the reference value RW13 or RW23 that is stored for a new catalytic converter, the jump of the voltage signal has displaced more significantly with the changeover from high to lower, than the jump of the voltage signal with the changeover from low to high, and damage of the oxidizing capabilities of the catalytic converter, or of the conversion of carbon monoxide (CO) and hydrocarbon (HC) is assumed during the diagnosis.

And, if the ratio between the first oxygen storage capacity OSC1 and the second oxygen storage capacity OSC2 drops as opposed to the reference value RW12 that is stored for a new catalytic converter, the jump of the voltage signal has displaced more significantly with the changeover from low to high than the jump of the voltage signal with the changeover from high to low, and damage of the reducing capabilities of the catalytic converter, or of the conversion of nitric oxides (NOx) is assumed during the diagnosis.

Purposefully, a regeneration, or the replacement of the catalytic converter may be requested based on the result of the diagnosis.

DETAILED DESCRIPTION OF THE PREFERRED EMBODIMENT OF THE INVENTION

The internal combustion engine disposed in a motor vehicle has a three-way catalytic converter having a downstream binary lambda sensor. The voltage signal $U_\lambda$ of the lambda sensor is monitored for the diagnosis of the catalytic converter. In a new catalytic converter, the voltage signal $U_\lambda$ shows a large drop to below 0.6 volts at a load of the oxygen storage OSC of approximately 80%, which represents a conversion from a high to a low air/fuel ratio $\lambda$, and at a load of the oxygen storage OSC of approximately 20% it shows a large increase to above 0.7 volts, which represents a conversion from a low to a high air/fuel ratio $\lambda$.

Figure 1:
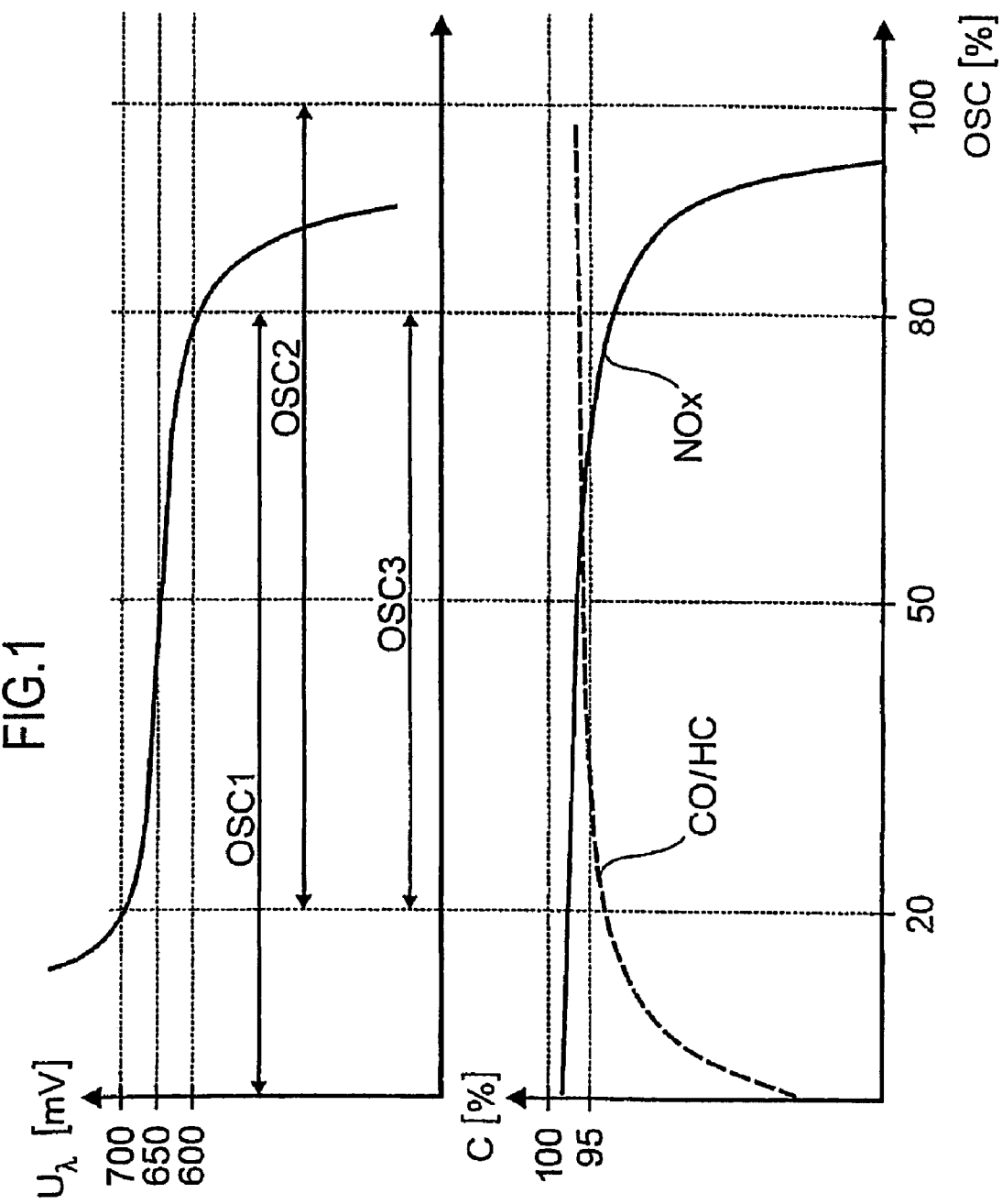
FIG. 1 is a schematic diagram of the sensor voltage, as well as of the conversion via the oxygen storage for a new catalytic converter.

FIG. 1 illustrates in a new three-way catalytic converter, how the sensor voltage $U_\lambda$ and the conversion C act for the carbon monoxide (CO), hydrocarbon (HC), and the nitric oxides (NOx) via the oxygen storage capacity OSC of the catalytic converter.

With the changeover of the air/fuel ratio $\lambda$ that is fed to the internal combustion engine from high to low, a first oxygen storage capacity OSC1 can be established via monitoring the voltage signal $U_\lambda$ for its jump to below 0.6 Volts. This first oxygen storage capacity OSC1 illustrated by a vector shows from what point on the three-way catalytic converter can only admit an insufficient amount of oxygen ($O_2$).

Alternatively, or in addition, a second oxygen storage capacity OSC2 may be established via monitoring the voltage signal $U_\lambda$ for its jump to above 0.7 volts with the changeover of the air/fuel ratio $\lambda$ that is fed to the internal combustion engine from low to high. This second oxygen storage capacity OSC2, which is also illustrated by a vector, allows an assertion as to from what point on the three-way catalytic converter can only deliver an insufficient amount of oxygen ($O_2$).

Therefore, the first and the second oxygen storage capacity OSC1 and OSC2 provide information on the size, or the regeneration time of the oxygen storage OSC, or on the size of the available surface storage, as well as the depth storage with a low or high air/fuel ratio $\lambda$.

Finally, a third oxygen storage capacity OSC3 can be established with a modulation of the air/fuel ratio $\lambda$ that is fed to the internal combustion engine between high and low, and the monitoring of both jumps of the voltage signal $U_\lambda$, which allows an assertion as to the storage behavior of the rapidly available surface storage.

Figure 2:
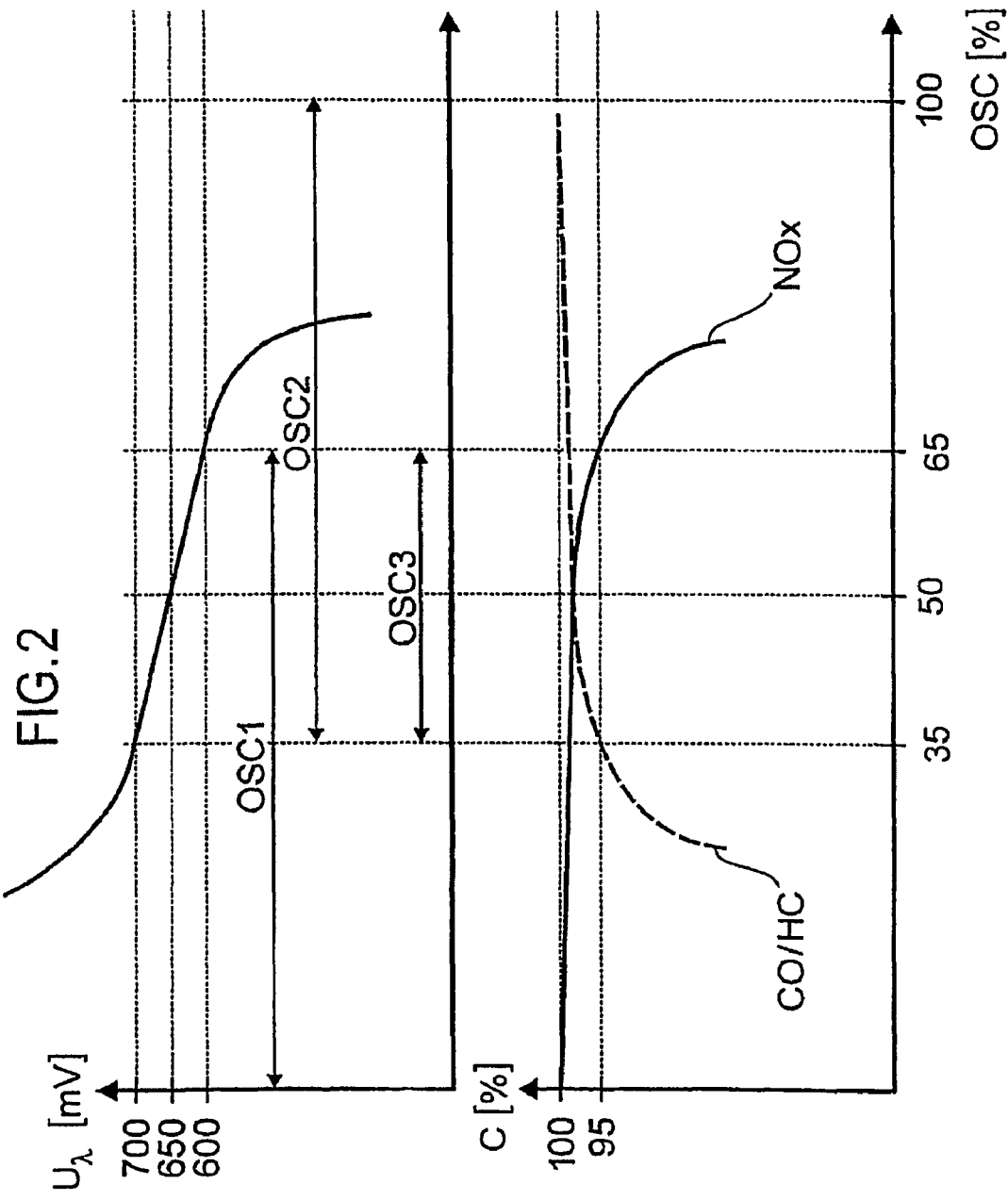
FIG. 2 is a schematic diagram of the sensor voltage, as well as of the conversion via the oxygen storage for an aged catalytic converter.

On the other hand, FIG. 2 illustrates how the sensor voltage $U_\lambda$ and the conversion act in an aged three-way catalytic converter. In this case, the first, second, and third oxygen storage capacities OSC1, OSC2, and OSC3 have deteriorated, or reduced, wherein it is obvious that the negative jump of the voltage signal $U_\lambda$ to below 0.6 Volts already occurs at a load of the oxygen storage OSC of approximately 65%, and the positive jump of the voltage signal $U_\lambda$ to above approximately 0.7 Volts already occurs at a load of the oxygen storage OSC of approximately 35%.

Figure 3:
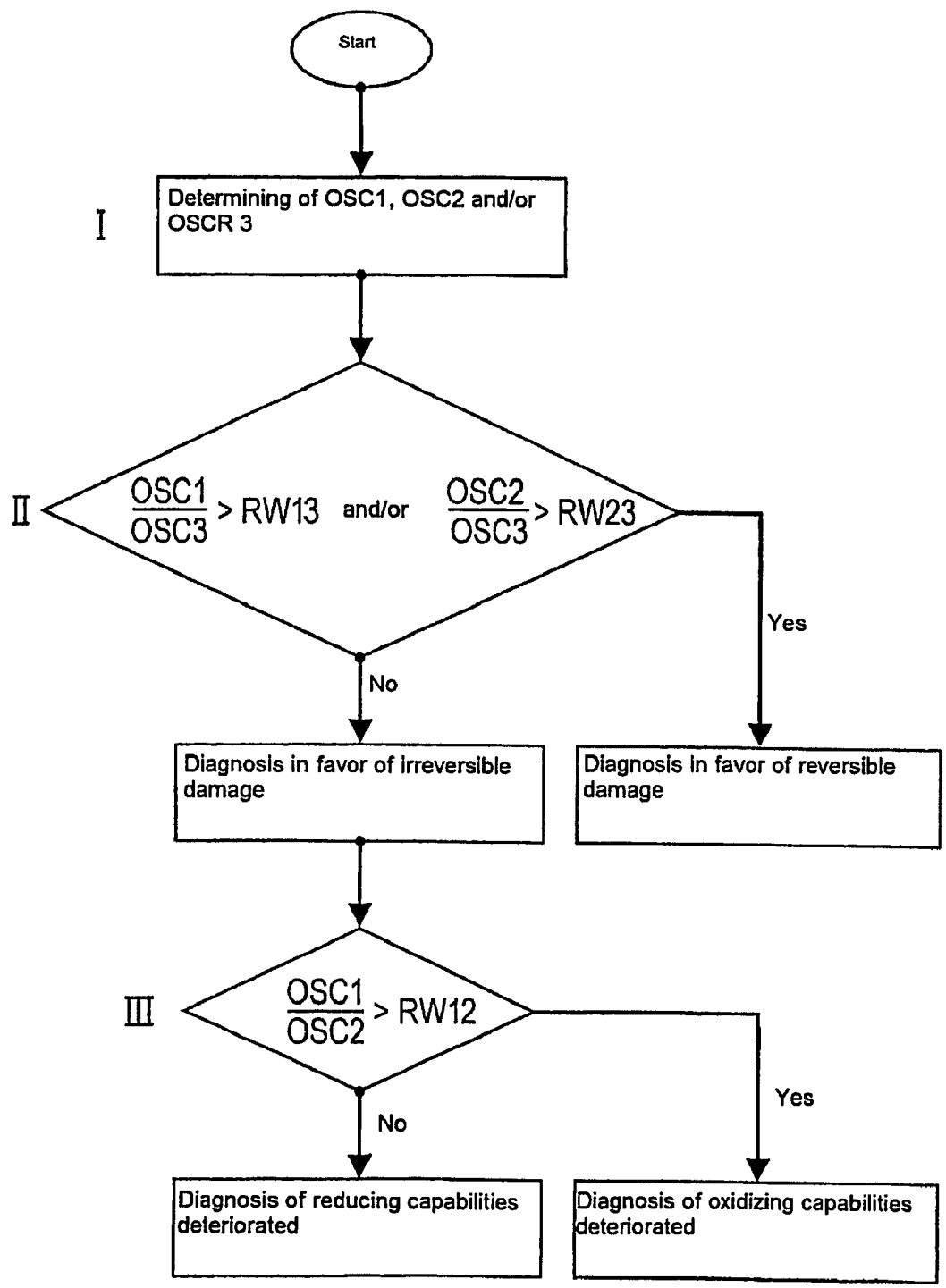
FIG. 3 is a simplified flow chart of the method.

For the diagnosis according to the invention the first oxygen storage capacity OSC1, the second oxygen storage capacity OSC2, and/or the third oxygen storage capacity OSC3 is established in a first step I according to the flow chart of FIG. 3 in an aged catalytic converter, such that at least two of the three oxygen storage capacities OSC1, OSC2, OSC3 are available for the subsequent diagnosis.

In a second step II the first oxygen storage capacity OSC1 is put into proportion with the third oxygen storage capacity OSC3, and/or the second oxygen storage capacity OSC2 is put into proportion with the third oxygen storage capacity OSC3. Based on this ratio OSC1/OSC3, or OSC2/OSC3 it can be determined, whether the ratio has increased or dropped as opposed to a reference ratio, or a reference value RW13 or RW23, which has been established for a new catalytic converter. Depending on this, the changeover of the first oxygen storage capacity OSC1, or of the second oxygen storage capacity OSC2, or of the third oxygen storage capacity OSC3, will prevail.

If the ratio with regard to the reference value RW 13, or RW23 has increased, the changeover, or reduction of the third oxygen storage capacity OSC3 will dominate. Accordingly, a pronounced deterioration of the thermal conversion is present, which indicates a reversible damage of the catalytic converter.

And if the ratio as compared to the reference values RW13, RW23 has dropped, the changeover, or the reduction of the first or second oxygen storage capacities OSC1, OSC2 will dominate. Thus, a pronounced deterioration of the oxygen storage has occurred, which indicates an irreversible damage of the catalytic converter.

Alternatively, or additionally, a further diagnosis may be performed in a step III that is parallel to, or—as illustrated in FIG. 3—downstream from—step II, based on the ratio between the first oxygen storage capacity OSC1 and the second oxygen storage capacity OSC2, and comparison of this ratio OSC1/OSC2 to a reference value RW12 for a new catalytic converter. Conclusions as to the oxidizing or reducing capabilities of the catalytic converter are possible by means of this comparison. Thus, a dominance of the deterioration of the first oxygen storage capacity OSC1 suggests damage to the reducing capacities, i.e. the conversion of nitric oxides (NOx), while a dominance of the deterioration of the second oxygen storage capacity OSC2 suggests damage to the oxidizing capabilities, i.e. the conversion C of carbon monoxide (CO) and hydrocarbon (HC).

The invention claimed is:

1. A method for providing a diagnosis of a three-way catalytic converter for an internal combustion engine using a voltage signal of a downstream binary lambda sensor, comprising:

monitoring the voltage signal of the lambda sensor when a predefined condition for an air/fuel ratio fed to the internal combustion engine is met, wherein a first oxygen storage capacity is established when the predefined condition is a high to low changeover, wherein a second oxygen storage capacity is established when the predefined condition is a low to high changeover, wherein a third oxygen storage capacity is established when the predefined condition is a modulation between high and low; and performing the diagnosis of the catalytic converter based on a ratio between two of the three oxygen storage capacities.

2. The method according to claim 1, wherein reversible damage of the catalytic converter is assumed during the diagnosis, if the ratio between the first oxygen storage capacity and the third oxygen storage capacity increases as opposed to a reference value that is stored for a new catalytic converter; and wherein reversible damage of the catalytic converter is assumed during the diagnosis, if the ratio between the second oxygen storage capacity and the third oxygen storage capacity increases as opposed to a reference value that is stored for a new catalytic converter.

3. The method according to claim 1, wherein irreversible damage of the catalytic converter is assumed during the diagnosis, if the ratio between the first oxygen storage capacity and the third oxygen storage capacity drops as opposed to a reference value that is stored for a new catalytic converter; and wherein irreversible damage of the catalytic converter is assumed during the diagnosis, if the ratio between the second oxygen storage capacity and the third oxygen storage capacity drops as opposed to a reference value that is stored for a new catalytic converter.

4. The method according to claims 1, wherein damage to the oxidizing capacities of the catalytic converter is assumed during the diagnosis, if the ratio between the first storage capacity and the second storage capacity increases as opposed to a reference value that is stored for a new catalytic converter.

5. The method according to claims 1, wherein damage to the reducing capacities of the catalytic converter is assumed during the diagnosis, if the ratio between the first oxygen storage capacity and the second oxygen storage capacity increases as opposed to a reference value that is stored for a new catalytic converter.

6. The method according to claims 1, wherein based on the result of the diagnosis, the regeneration or replacement of the catalytic converter may be requested.

7. A method of diagnosing the capacity of a three-way catalytic converter for an internal combustion engine utilizing the voltage signal of a downstream binary lambda sensor, comprising:

monitoring the increase of the voltage signal of the lambda sensor upon a changeover from a high to low air/fuel ratio fed to the engine to establish a first oxygen storage capacity (OSC1) of the converter;

monitoring the increase in the voltage signal of the lambda sensor upon a changeover of a low to high air/fuel ratio fed to, the engine to establish a second oxygen storage capacity (OSC2) of the converter;

monitoring the increase of the voltage signal of the lambda sensor upon a modulation of the air/fuel ratio fed to the engine to establish a third, oxygen storage capacity (OSC3) of said converter; and comparing at least one of $^{osc1}/_{osc3}$ and $^{osc2}/_{osc3}$ with a reference value wherein a ratio greater than the reference value indicates a reversible capacity of the converter and a ratio less than the reference value indicates an irreversible capacity of the converter.

* * * * *